US012336947B2

(12) United States Patent
Wang et al.

(10) Patent No.: US 12,336,947 B2
(45) Date of Patent: Jun. 24, 2025

(54) REHABILITATION ROBOT ASSISTED MOTION SYSTEM AND METHOD BASED ON MOTION INTENTION

(71) Applicant: SHANGHAI ZD MEDICAL TECHNOLOGY CO., LTD, Shanghai (CN)

(72) Inventors: Yixi Wang, Shanghai (CN); Xiang Chen, Shanghai (CN); Zhuo Jian, Shanghai (CN); Daoyu Wang, Shanghai (CN)

(73) Assignee: SHANGHAI ZD MEDICAL TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 19/023,082

(22) Filed: Jan. 15, 2025

(65) Prior Publication Data

US 2025/0161136 A1 May 22, 2025

Related U.S. Application Data

(63) Continuation of application No. PCT/CN2024/108142, filed on Jul. 29, 2024.

(30) Foreign Application Priority Data

Nov. 16, 2023 (CN) ......................... 202311528072.9

(51) Int. Cl.
*A63B 24/00* (2006.01)
*A61H 1/02* (2006.01)

(52) U.S. Cl.
CPC ....... *A61H 1/0262* (2013.01); *A63B 24/0062* (2013.01); *A61H 2201/1659* (2013.01)

(58) Field of Classification Search
CPC .......... A61H 2201/1659; A61H 1/0262; A61H 1/02; A61B 24/0062; A63B 24/00
See application file for complete search history.

(56) References Cited

U.S. PATENT DOCUMENTS

2017/0293356 A1* 10/2017 Khaderi ................ A61B 3/113

FOREIGN PATENT DOCUMENTS

CN 113842290 A1 12/2021

* cited by examiner

*Primary Examiner* — George Manuel
(74) *Attorney, Agent, or Firm* — Ying-Ting Chen

(57) ABSTRACT

Disclosed are a rehabilitation robot assisted movement method and a system based on a user's active movement intention. The method includes acquiring an eye movement information of the user; processing the eye movement information to generate a user focus level coefficient; and in response to the user focus level coefficient satisfying a preset condition, based on the eye movement information, generating an execution control signal, for controlling an actuator to assist the user in motion.

13 Claims, 5 Drawing Sheets

REHABILITATION ROBOT ASSISTED MOTION SYSTEM AND METHOD BASED ON MOTION INTENTION

CROSS REFERENCE OF RELATED APPLICATION

This application is a Continuation application of the International Application PCT/CN2024/108142, filed on Jul. 29, 2024, which claims the benefit of Chinese Patent Application No. 202311528072.9, filed on Nov. 16, 2023, wherein the contents of which are incorporated herein by reference in their entirety.

TECHNICAL FIELD

The present disclosure relates to rehabilitation robots, and further relates to a rehabilitation robot assisted motion system and method based on motion intention.

BACKGROUND

The rehabilitation robot is considered to be a "wearable device" in special environments and has functions such as helping the disabled walk, rehabilitation treatment, and reducing labor intensity. The rehabilitation robot is a high-level rehabilitation medical technology developed in recent years. It is the product of the combination of robot technology and medical technology, helps disabled patients regain their motion function, and brings hope of returning to society.

The rehabilitation robots are currently mainly suitable for upper or lower limb motion dysfunction caused by stroke, brain injury, spinal injury, neurological injury, muscle injury, and orthopedic diseases. It helps patients reshape brain motion nerves and restore the brain's control of upper limb movement, thereby improving patients' daily living ability.

The rehabilitation robot can be divided into rehabilitation treatment/training robot, auxiliary terminal robot, and intelligent robot combined with health care, according to functional classifications. According to the body parts, it can be divided into upper limb robots and lower limb robots. According to the manner of the human-machine combination, it can also be atmospheric into an exoskeleton type and an embedded type.

It should be pointed out that in the process of using the conventional rehabilitation robot for rehabilitation training, the rehabilitation training is passive, and the patient can only perform rehabilitation training according to the original set functions of the rehabilitation equipment, which cannot be matched with the user's motion intention, and the effects of rehabilitation training are limited.

SUMMARY

In view of the above-described technical problems, an object of the present disclosure is to provide a rehabilitation robot assisted motion system and method based on a patient's motion intention, capable of acquiring an active motion intention of a user, capable of controlling a motion of an actuator based on the active motion intention of the user, and capable of improving the effects of rehabilitation training of the user.

In order to achieve the above object, the present disclosure provides a rehabilitation robot assisted motion method based on an active motion intention of a user, comprising:

acquiring an eye movement information of the user;

processing the eye movement information to generate a user focus level coefficient; and in response to the user focus level coefficient satisfying a preset condition, based on the eye movement information, generating an execution control signal, for controlling an actuator to assist the user in motion.

In some embodiments, the disclosure further provides a rehabilitation robot assisted motion system based on an active motion intention of a user, comprising:

a signal acquisition module, configured to acquire an eye movement information of the user;

a signal process module, configured to process the eye movement information to generate a user focus level coefficient; and a motion intention evaluation module, configured to, in response to the user focus level coefficient satisfying a preset condition, based on the eye movement information, generate an execution control signal, for controlling an actuator to assist the user in motion.

Beneficial Effects:

1) The present disclosure can acquire the active motion intention of the user, control the actuator to move based on the active motion intention of the user, and improve the effects of the rehabilitation training of the user;
2) The present disclosure is aimed at users who have no active motion ability, determines the user's motion intention through the eye movement information, and assists the user to move based on the motion intention, which is conducive to improving the effects of the rehabilitation training;
3) The present disclosure can adaptively adjust the operating parameters to adaptively adjust the exercise intensity, which will effectively increase the motivation and the participation level of users in training; and
4) The present disclosure provides a variety of exercise modes to choose from, which can meet the various usage requirements of the user.

BRIEF DESCRIPTION OF THE DRAWINGS

Hereinafter, the above features, technical features, advantages, and implementations of the present disclosure will be further described in a clear and easily understood manner with reference to the embodiment and the accompanying drawings.

DETAILED DESCRIPTION OF THE EMBODIMENTS

Figure 1:
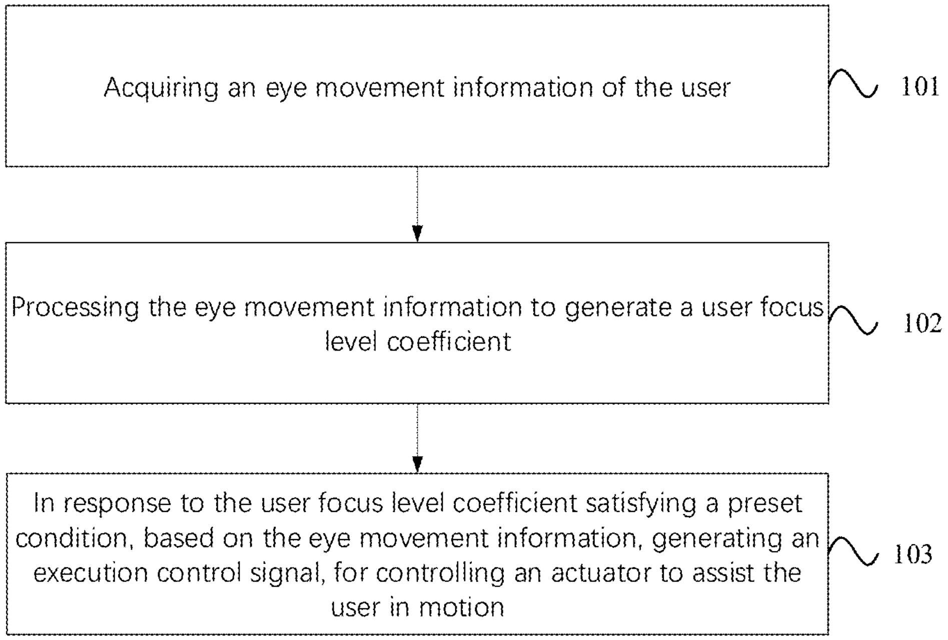
FIG. 1 is a flowchart of a rehabilitation robot assisted motion method based on an active motion intention of a user according to an embodiment of the present disclosure.
Figure 2:
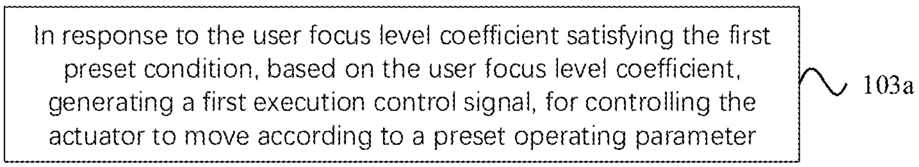
FIG. 2 is a first sub-flowchart of the rehabilitation robot assisted motion method based on the active motion intention of the user according to the embodiment of the present disclosure.
Figure 3:
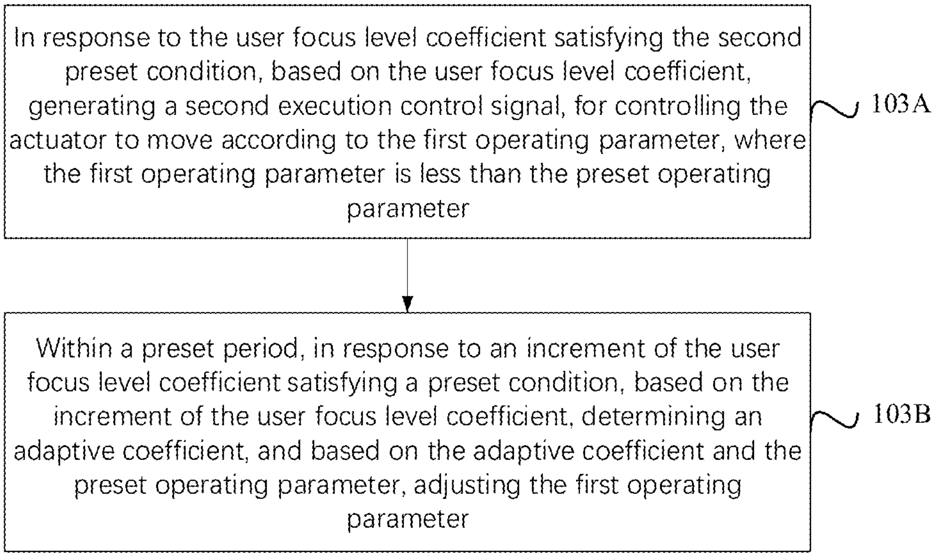
FIG. 3 is a second sub-flowchart of the rehabilitation robot assisted motion method based on the active motion intention of the user according to the embodiment of the present disclosure.
Figure 4:
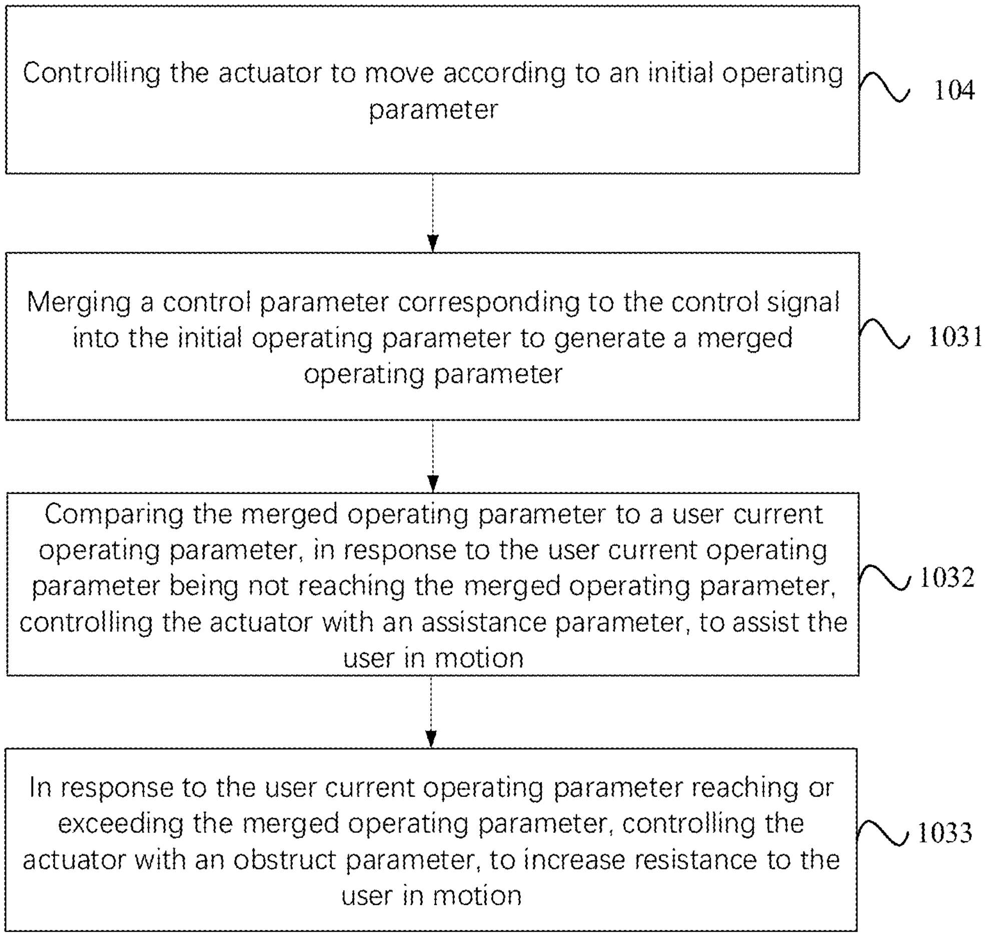
FIG. 4 is a third sub-flowchart of the rehabilitation robot assisted motion method based on the active motion intention of the user according to the embodiment of the present disclosure.

In order to more clearly explain the embodiments of the present disclosure or the technical solutions in the prior art, specific embodiments of the present disclosure will be described below with reference to the accompanying drawings. It is obvious that the drawings in the following description are only some embodiments of the present disclosure, and other drawings and other embodiments can be acquired from these drawings without making creative efforts to those skilled in the art.

For the sake of simplicity of the drawings, only the parts related to the disclosure are schematically shown in the drawings, and they do not represent the actual structure thereof as a product. In addition, in order to make the drawings simple and easy to understand, in some drawings, only one of the components having the same structure or function is schematically illustrated or only one of the components is referred. Herein, "a/an" means not only "only one", but also "more than one".

It should be further understood that the term "and/or" as used in the specification of this disclosure and the appended claims refers to any combination and all possible combinations of one or more of the associated listed items, and comprises such combinations.

In the present specification, it should be noted that unless otherwise specified and defined, the terms "mounted", "attached", and "connected" are to be understood in a broad sense, for example, can be fixedly connected, may be detachably connected, or can be integrally connected. It can be a mechanical connection or an electrical connection. It can be directly connected, or indirectly connected through an intermediate medium, and it can be the internal communication of two elements. The specific meanings of the above terms in the present disclosure will be understood by those skilled in the art.

In addition, in the description of the present disclosure, the terms "first", "second", and the like are used only to distinguish the description, and cannot be understood as indicating or implying relative importance.

Recent studies have shown that the human nervous system has plasticity throughout whole life, that is, the nervous system will adapt to the changes of the external environment through "re-learning", or its own structure and function will be constantly modified and reorganized when it is damaged. As an important foundation of modern medical rehabilitation, neural plasticity is also the most important thing in rehabilitation training. Nerve reorganization and compensation are important features in the process of nerve reorganizing. Studies have shown that the important factors affecting nerve reorganization in rehabilitation training include appropriate training prescription and active participation of patients. Even if users have no ability to actively move, the active motion intention is necessary to ensure the training effect. Effectively identifying the active motion intention of the user is one of the keys for rehabilitation robots to ensure the rehabilitation training effects of the patients.

The eye movement information of humans is related to the thinking content of the brain. The information quantity that the brain can process at the same time is limited. In order to decide which information needs to be processed in time, humans and many other animals have evolved an information selection mechanism, which is usually called focus. Focus is pointing or concentrating on a certain object in psychological activities. Focus enables people to selectively process some stimulation and ignore others, so as to avoid information overload in the brain. A large number of studies have confirmed that the position of the eye is usually related to the thing being focused and considered, especially when observing an object with a goal in mind. This is known as the eye-brain consistency hypothesis. According to the eye-brain consistency hypothesis, the present disclosure incorporates the eye movement information into the rehabilitation training and effectively improves the rehabilitation training effects.

Embodiment I

FIG. 1 is a flowchart of the rehabilitation robot assisted motion method based on the active motion intention of the user according to an embodiment of the present disclosure. With reference to FIG. 1, the rehabilitation robot assisted motion method based on an active motion intention of the user, comprises:

101, acquiring an eye movement information of the user;

102, processing the eye movement information to generate a user focus level coefficient; and

103, in response to the user focus level coefficient satisfying a preset condition, based on the eye movement information, generating an execution control signal, for controlling an actuator to assist the user in motion.

In the rehabilitation robot assisted motion method based on the active motion intention of the user according to the present disclosure, the active motion intention of the user can be evaluated based on the eye movement information of the user, and the eye movement information can be merged into the rehabilitation training, and the effects of the rehabilitation training can be improved.

In some embodiments, in the above step 101, the eye movement information of the user is from an eye movement sensor 100. The eye movement sensor 100 can locate the pupil position by image processing technology, acquire coordinates, and calculate the point at which the eye is fixed on or gazed at by a certain algorithm. In some embodiments, the eye movement sensor 100 is a "non-invasive" technology based on VOG (Video oculographic). The basic principle is that a ray of light (near-infrared light) and a camera are directed at the subject's eye, and the direction of the subject's gaze is inferred through the light and the rear-terminal analysis. The camera records the interaction process. In addition to monitoring the gaze, the eye movement sensor can also display other useful measurements comprising pupil size and blink rate.

In some embodiments, in the above step 102, the user focus level coefficient is calculated by the following formula:

$$C_{focus} = \frac{f_{focus}}{(t_{curr} - t_{start})f_{eye}}$$

where $C_{focus}$ is the user focus level coefficient, $t_{start}$ is the time when the motion target appears, $t_{curr}$ is the current time, and $f_{eye}$ is the sampling frequency of the eye movement information.

$f_{focus}$ is the number of times of eye movements satisfying the condition of $|P_{eye}-P_{targ}|<|r_{targ}|$ during a period from $t_{start}$ to $t_{curr}$, where $P_{targ}$ is the coordinate of the motion target, $P_{eye}$ is the coordinate of the gaze target acquired by mapping the sensed eye movement information of the user, and $r_{targ}$ is the preset distance.

In some embodiments, the above step 103 comprises:

103*a*, in response to the user focus level coefficient satisfying the first preset condition, based on the user focus level coefficient, generating a first execution control signal, for controlling the actuator to move according to a preset operating parameter.

In some embodiments, the preset operating parameter comprises a preset target velocity parameter $V_{targ}$ and a preset target force parameter $F_{targ}$. In the above step 103*a*, in a case where $C_{focus}>C_{cons}$, it is considered that the user focus level coefficient satisfies the first preset condition, where $C_{cons}$ is the preset focus threshold under a constant assist mode, and the rehabilitation robot assists the user to move to the target with the preset target velocity parameter $V_{targ}$ and the preset target force parameter $F_{targ}$. The above described step 103*a* can be defined as the constant assist mode.

In some embodiments, the above step 103 comprises:

103A, in response to the user focus level coefficient satisfying the second preset condition, based on the user focus level coefficient, generating a second execution control signal, for controlling the actuator to move according to the first operating parameter, where the first operating parameter is less than the preset operating parameter; and

103B, within a preset period, in response to an increment of the user focus level coefficient satisfying a preset condition, based on the increment of the user focus level coefficient, determining an adaptive coefficient, and based on the adaptive coefficient and the preset operating parameter, adjusting the first operating parameter.

In the above step 103A, the first operating parameter is a certain percentage of the preset operating parameter. In the above step 103B, in a case where the focus level coefficient of the user is increased, based on the adaptive coefficient, the percentage in which the first operating parameter is in the preset operating parameter is adaptively increased, until the preset operating parameter is reached. The above steps 103A and 103B can adaptively adjust the operating parameters to adaptively adjust the exercise intensity, which will effectively increase the motivation and the participation level of users in training. The above described steps 103A and 103B can be defined as an adaptive assist mode.

In the above step 103B, the adaptive coefficient $\mu_{adap}$ is calculated by the following formula:

$$\mu_{adpa} = \phi(C_{focus} - C_{adpa})$$

where $C_{adpa}$ is a preset focus threshold and $\phi$ is a focus scaling coefficient.

For example, according to the preset target velocity parameter $V_{targ}$, the adaptive velocity parameter $V_{adap}=\mu_{adap}V_{targ}$ is calculated. According to the preset target force parameter $F_{targ}$, the adaptive force parameter $F_{adap}=\mu_{adap}F_{targ}$ is calculated. The rehabilitation robot assists the user in motion with the adaptive velocity parameter $V_{adap}$ and the adaptive force parameter $F_{adap}$.

In some embodiments, the rehabilitation robot assisted motion method based on the active motion intention of the user, before acquiring the eye movement information of the user, further comprises:

104, controlling the actuator to move according to an initial operating parameter.

The above step 103 further comprises:

1031, merging a control parameter corresponding to the control signal into the initial operating parameter to generate a merged operating parameter;

1032, comparing the merged operating parameter to a user current operating parameter, in response to the user current operating parameter not reaching the merged operating parameter, controlling the actuator with an assistance parameter, to assist the user in motion; and

1033, in response to the user current operating parameter reaching or exceeding the merged operating parameter, controlling the actuator with an obstruct parameter, to increase resistance to the user in motion.

In some embodiments, the above described steps 1031, 1032, and 1033 can be defined as an adaptive assist mode.

In some embodiments, the initial operating parameter comprises an initial motion velocity $V_{init}$ and a target force parameter $F_{targ}$, and the assistance parameter comprises an adaptive velocity parameter $V_{adap}$ being determined by the following formula:

$$V_{adpa} = \mu_{adpa}(V_{targ} - V_{init}) + V_{init}$$

$$\mu_{adpa} = \phi(C_{focus} - C_{adpa})$$

where $C_{adpa}$ is a preset focus threshold, $\phi$ is the focus scaling coefficient, and $V_{targ}$ is the preset target velocity parameter.

In some embodiments, where the user current operating parameter reaches or exceeds the merged operating parameter, the actuator is controlled with the target force parameter $F_{targ}$, to increase the resistance to the user in motion.

Embodiment II

The present disclosure further provides a rehabilitation robot assisted motion system based on an active motion intention of a user, comprising a signal acquisition module 10, a signal processing module 20, and a motion intention evaluation module 30, where the signal acquisition module 10 is configured to acquire an eye movement information of the user, the signal processing module 20 is configured to process the eye movement information to generate a user focus level coefficient, and the motion intention evaluation module 30 is configured to, in response to the user focus level coefficient satisfying a preset condition, based on the eye movement information, generate an execution control signal for controlling a motion of the actuator 40.

In some embodiments, the actuator 40 is a driver, such as a motor or the like, capable of assisting the user in performing a rehabilitation exercise.

In some embodiments, the signal processing module 20 comprises a timing unit 21, a frequency acquisition unit 22, a coordinate acquisition unit 23, a counting unit 24, and a calculation unit 25. The timing unit 21 is configured to record a time $t_{start}$ when the motion target appears and a current time $t_{cur}$. The frequency acquisition unit 22 is configured to acquire a sampling frequency $f_{eye}$ during acquiring the eye movement information of the user. The coordinate acquisition unit 23 is configured to acquire the coordinate $P_{targ}$ of the preset motion target and the coordinate $P_{eye}$ of the gaze target by mapping the sensed eye movement information of the user. The counting unit 24 is configured to count the number of times $f_{focus}$ of eye movements that satisfy the condition of $|P_{eye}-P_{targ}|<|r_{targ}|$ within a time period from $t_{start}$ to $t_{curr}$, where $r_{targ}$ is a preset distance. The calculation unit 25 is configured to determine the user focus level coefficient $C_{focus}$ based on the following formula:

$$C_{focus} = \frac{f_{focus}}{(t_{curr} - t_{start})f_{eye}}.$$

In some embodiments, the motion intention evaluation module 30 comprises a determination unit 31 and a control signal generation unit 32. The determination unit 31 is configured to determine whether the user focus level coefficient satisfies a first preset condition. In a case where the user focus level coefficient satisfies the first preset condition, the control signal generation unit 32 is configured to generate a first execution control signal based on the user focus level coefficient, for controlling the actuator to move according to a preset operating parameter.

In the above embodiment, when the user focus level coefficient satisfies the first preset condition, it can be determined that the user has reached a certain focus level for the motion target, and then the rehabilitation robot assists the user in reaching the motion target according to the preset operating parameter. On the contrary, if the user focus level coefficient does not satisfy the first preset condition, it means that the user's focus level on the motion target is not reached, and the rehabilitation robot does not assist the user in motion.

In some embodiments, the determination unit 31 is further configured to determine whether the user focus level coefficient satisfies a second preset condition. In a case where the user focus level coefficient satisfies the second preset condition, the control signal generation unit 32 is configured to generate a second execution control signal based on the user focus level coefficient, for controlling the actuator to move according to a first operating parameter. Optionally, the intensity of the first operating parameter is less than the preset operating parameter, in other words, the first operating parameter is only a certain proportion of the preset operating parameter.

The motion intention evaluation module 30 further comprises an adaptive coefficient calculation unit 33. Within a preset period, in response to an increment of the user focus level coefficient of time, the adaptive coefficient calculation unit 33 can be configured to, based on the increment of the user focus level coefficient, determine an adaptive coefficient. The control signal generation unit 32 is configured to, based on the adaptive coefficient and the preset operating parameter, adjust the first operating parameter. Optionally, during the user focus level coefficient gradually increases, based on the adaptive coefficient, the proportion of the first operating parameter in the preset operating parameter is increased, until the first operating parameter is equal to the preset operating parameter.

Figure 5:
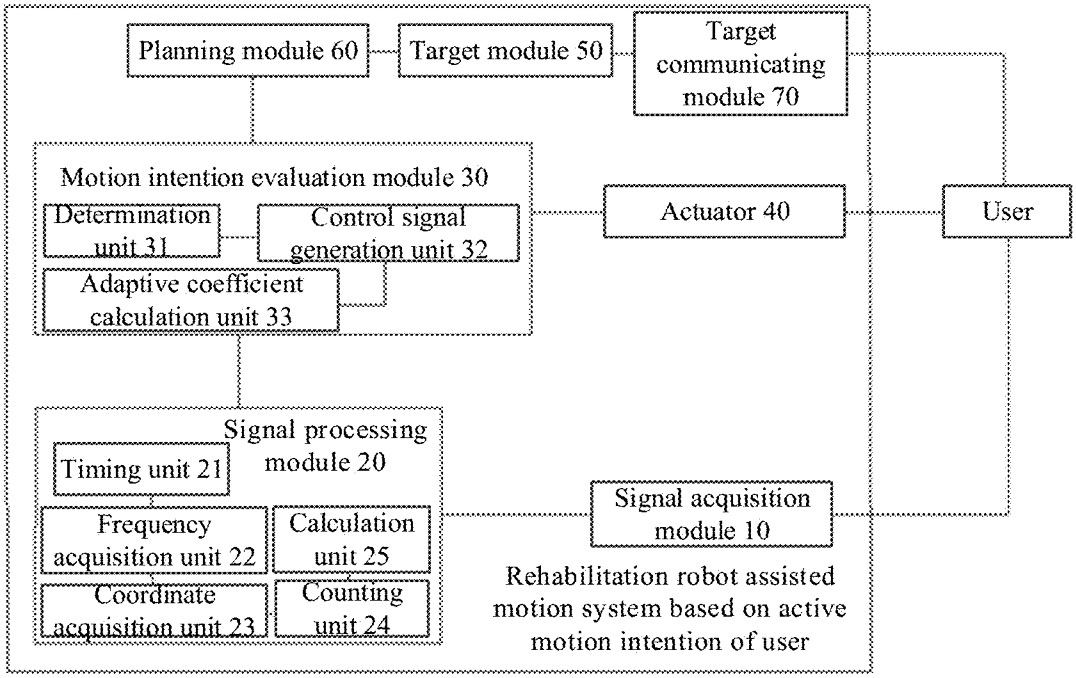
FIG. 5 is a structural block diagram of the rehabilitation robot assisted motion system based on the active motion intention of the user according to the other embodiment of the present disclosure.
Figure 6:
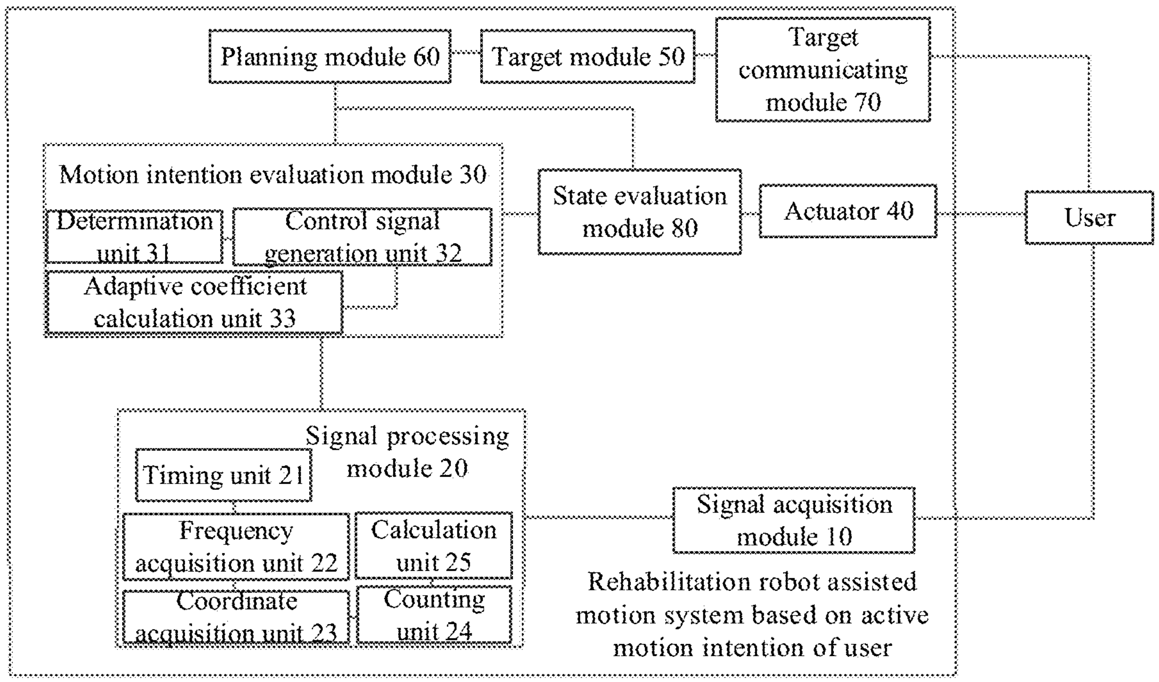
FIG. 6 is a structural block diagram of the rehabilitation robot assisted motion system based on the active motion intention of the user according to another alternative embodiment of the present disclosure.

With reference to FIG. 5, the rehabilitation robot assisted motion system based on the active motion intention of the user further comprises a state evaluation module 80. The state evaluation module 80 is communicatively connected to a planning module 60, the motion intention evaluation module 30, and the actuator 40 respectively. The state evaluation module 80 is configured to acquire an initial motion parameter from the planning module 60, acquire the user intention parameter from the motion intention evaluation module 30, and merge the initial motion parameter and the user intention parameter to generate a merged operating parameter.

The state evaluation module 80 is further configured to compare the merged operating parameter with a user current operating parameter, if the user current operating parameter does not reach (less than) the merged operating parameter, appropriately control the actuator to assist the user movement with a certain force (controlling the actuator to operate with an assistance parameter), and if the user current operating parameter exceeds (greater than) the merged operating parameter, appropriately control the actuator to block the user movement with a certain force.

With reference to FIG. 5, in some embodiments, the rehabilitation robot assisted motion system based on the active motion intention of the user further comprises a target module 50. The target module 50 is configured to store a training target comprising a pre-stored scheme or an adjustable setting parameter for designing a motion target and comprising target quantities such as target position/angle or target trajectory.

In some embodiments, the rehabilitation robot assisted motion system based on the active motion intention of the user further comprises a planning module 60. The planning module 60 is configured to process the training target for converting single or abstract training targets into fixed motions, force parameters, or the like executable by the rehabilitation robot.

In some embodiments, the rehabilitation robot assisted motion system based on the active motion intention of the user further comprises a target communicating module 70, for converting the training target into a visual signal, an auditory signal, a tactile signal, or the like to guide the user to perform training. For example, the target communication module 70 is a display capable of converting the training target into an image signal for display or playback by sound.

It should be noted that all of the above-described embodiments can be freely combined as necessary. The above are only embodiments of the present disclosure, and it should be pointed out that for those skilled in the art, several improvements and retouches can be made without departing from the principles of the present disclosure, and these improvements and retouches should also be regarded as the scope of protection of the present disclosure.

What is claimed is:

1. A rehabilitation robot assisted motion method, based on an active motion intention of a user, comprising:

acquiring an eye movement information of the user;

processing the eye movement information to generate a user focus level coefficient; and in response to the user focus level coefficient satisfying a preset condition, based on the eye movement information, generating an execution control signal, for controlling an actuator to assist the user in motion, wherein the user focus level coefficient is calculated by the following formula:

$$C_{focus} = \frac{f_{focus}}{(t_{curr} - t_{start})f_{eye}}$$

wherein $C_{focus}$ is the user focus level coefficient; $t_{start}$ is a time when a motion target appears; $t_{curr}$ is a current time; $f_{eye}$ is a sampling frequency of the eye movement information; and $f_{focus}$ is a number of times of eye movements satisfying the condition of $|P_{eye}-P_{targ}|<|r_{targ}|$ during a period from $t_{start}$ to $t_{curr}$, wherein $P_{targ}$ is a coordinate of the motion target, $P_{eye}$ is a coordinate of the gaze target by mapping the sensed eye movement information of the user, and $r_{targ}$ is a preset distance.

2. The rehabilitation robot assisted motion method, based on the active motion intention of the user, according to claim 1, wherein the step of in response to the user focus level coefficient satisfying a preset condition, based on the eye movement information, generating an execution control signal further comprises:

in response to the user focus level coefficient satisfying a first preset condition, based on the user focus level coefficient, generating a first execution control signal, for controlling the actuator to move according to a preset operating parameter.

3. The rehabilitation robot assisted motion method, based on the active motion intention of the user, according to claim 2, wherein the step of in response to the user focus level coefficient satisfying a preset condition, based on the eye movement information, generating an execution control signal further comprises:

in response to the user focus level coefficient satisfying a second preset condition, based on the user focus level coefficient, generating a second execution control signal, for controlling the actuator to move according to a first operating parameter, wherein the first operating parameter is less than the preset operating parameter; and within a preset period, in response to an increment of the user focus level coefficient satisfying a preset condition, based on the increment of the user focus level coefficient, determining an adaptive coefficient, and based on the adaptive coefficient and the preset operating parameter, adjusting the first operating parameter.

4. The rehabilitation robot assisted motion method, based on the active motion intention of the user, according to claim 3, wherein the adaptive coefficient $\mu_{adpa}$ is calculated as follows:

$$\mu_{adpa} = \phi(C_{focus} - C_{adpa})$$

where $C_{adpa}$ is a preset focus threshold and $\phi$ is a focus scaling coefficient.

5. The rehabilitation robot assisted motion method, based on the active motion intention of the user, according to claim 1, before acquiring the eye movement information of the user, further comprising:

controlling the actuator movement according to the initial operating parameter;

wherein the step of in response to the user focus level coefficient satisfying a preset condition, based on the eye movement information, generating an execution control signal, for controlling an actuator to assist the user in motion, further comprises:

merging a control parameter corresponding to the control signal into the initial operating parameter to generate a merged operating parameter;

comparing the merged operating parameter to a user current operating parameter, in response to the user current operating parameter being not reaching the merged operating parameter, controlling the actuator with an assistance parameter, to assist the user in motion; and in response to the user current operating parameter reaching or exceeding the merged operating parameter, controlling the actuator with an obstruct parameter, to increase resistance to the user in motion.

6. The rehabilitation robot assisted motion method, based on the active motion intention of the user, according to claim 5, wherein the initial operating parameter comprises an initial motion speed $V_{init}$ and a target force parameter $F_{targ}$, and the assistance parameter comprises an adaptive velocity parameter $V_{adap}$, and $V_{adap}$ is determined by the following formula:

$$V_{adpa} = \mu_{adpa}(V_{targ} - V_{init}) + V_{init}$$

$$\mu_{adpa} = \phi(C_{focus} - C_{adpa})$$

wherein $C_{adpa}$ is a preset focus threshold, $\phi$ is the focus scaling coefficient, and $V_{targ}$ is the preset target velocity parameter.

7. The rehabilitation robot assisted motion method, based on the active motion intention of the user, according to claim 6, wherein in response to the user current operating parameter reaching or exceeding the merged operating parameter, the actuator is controlled with the target force parameter $F_{targ}$ to increase a resistance of the user in motion.

8. A rehabilitation robot assisted motion system based on an active motion intention of a user, comprising:

a signal acquisition module, configured to acquire an eye movement information of the user;

a signal process module, configured to process the eye movement information to generate a user focus level coefficient; and a motion intention evaluation module, configured to, in response to the user focus level coefficient satisfying a preset condition, based on the eye movement information, generate an execution control signal, for controlling an actuator to assist the user in motion, wherein the signal processing module comprises:

a timing unit, configured to record a time $t_{start}$ when a motion target appears and a current time $t_{curr}$;

a frequency acquisition unit, configured to acquire an acquisition frequency at the time of acquisition of eye movement information of the user;

a coordinate acquisition unit, configured to acquire a coordinate $P_{targ}$ of a preset motion target and a coordinate $P_{eye}$ of a gaze target acquired by mapping the sensed eye movement information of the user; and a counting unit, configured to count a number of times of eye movements satisfying a $|P_{eye}-P_{targ}|<|r_{targ}|$ condition within a time period from $t_{start}$ to $t_{curr}$, wherein $r_{targ}$ is a preset distance; and a calculation unit, configured to determine the user focus level coefficient $C_{focus}$ based on the following formula:

$$C_{focus} = \frac{f_{focus}}{(t_{curr} - t_{start})f_{eye}}.$$

9. The rehabilitation robot assisted motion system, based on the active motion intention of the user, according to claim 8, wherein the motion intention evaluation module comprises:

a determination unit, configured to determine whether the user focus level coefficient satisfies a first preset condition; and a control signal generation unit, configured to, in case where the user focus level coefficient satisfies the first preset condition, based on the user focus level coefficient, generate a first execution control signal, for controlling the actuator to move according to a preset operating parameter.

10. The rehabilitation robot assisted motion system, based on the active motion intention of the user, according to claim 9, wherein the determination unit is further configured to determine whether the user focus level coefficient satisfies a second preset condition; and the control signal generation unit is further configured to, in case where the user focus level coefficient satisfies the second preset condition, based on the user focus level coefficient, generate a second execution control signal, for controlling the actuator to move according to a first operating parameter;

wherein the motion intent assessment module further comprises:

an adaptive coefficient calculation unit, configured to, within a preset period, in response to an increment of the user focus level coefficient of time, based on the increment of the user focus level coefficient, determine an adaptive coefficient;

wherein the control signal generation unit is configured to, based on the adaptive coefficient and the preset operating parameter, adjust the first operating parameter.

11. The rehabilitation robot assisted motion system, based on the active motion intention of the user, according to claim 10, further comprising:

a target module and a planning module, wherein the target module is configured to store a training target, and the planning module is configured to process the training target for converting single or abstract training targets into parameters executable by the rehabilitation robot.

12. The rehabilitation robot assisted motion system, based on the active motion intention of the user, according to claim 11, further comprising:

a state evaluation module, communicatively connected to the planning module and the motion intention evaluation module respectively;

wherein the state evaluation module is configured to acquire an initial motion parameter from the planning module, acquire the user focus level coefficient from the motion intention evaluation module, merge the initial motion parameter and the user focus level coefficient to generate a merged operating parameter, compare the merged operating parameter with a user current operating parameter, in case where the user current operating parameter does not reach the merged operating parameter, control the actuator with an assistance parameter, to assist the user in motion, and in case where the user current operating parameter reaches or exceeds the merged operating parameter, to controlling the actuator with an obstruct parameter, to increase resistance to the user in motion.

13. The rehabilitation robot assisted motion system, based on the active motion intention of the user, according to claim 8, further comprising:

a target communicating module, configured to convert the training target into at least one of a visual signal, an auditory signal, and a tactile signal, for guiding the user to perform training.

* * * * *